US011050759B2

(12) United States Patent
Pignorel et al.

(10) Patent No.: US 11,050,759 B2
(45) Date of Patent: Jun. 29, 2021

(54) SECURE ADAPTIVE WIRELESS COMMUNICATIONS

(71) Applicant: NXP B.V., Eindhoven (NL)

(72) Inventors: Arnaud Pignorel, Verson (FR); Christophe Lombardo, Colombelles (FR); Claude Caron, Cormelles le Royal (FR); Nguyen Trieu Luan Le, Cormelles le Royal (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/172,642

(22) Filed: Oct. 26, 2018

(65) Prior Publication Data

US 2019/0132331 A1 May 2, 2019

(30) Foreign Application Priority Data

Oct. 26, 2017 (EP) ..................... 17306472

(51) Int. Cl.
*H04L 29/06* (2006.01)
*G01S 5/06* (2006.01)
*H04B 17/318* (2015.01)
*H04W 16/28* (2009.01)
*H04W 12/08* (2021.01)
*G01S 5/08* (2006.01)
*H04W 12/00* (2021.01)
(Continued)

(52) U.S. Cl.
CPC .............. *H04L 63/107* (2013.01); *G01S 5/06* (2013.01); *G01S 5/08* (2013.01); *H04B 17/318* (2015.01); *H04L 63/105* (2013.01); *H04W 12/08* (2013.01); *H04W 16/28* (2013.01); *H04W 4/023* (2013.01); *H04W 4/026* (2013.01); *H04W 12/63* (2021.01)

(58) Field of Classification Search
CPC . H04L 27/2605; H04L 5/005; H04L 25/0206; H04L 25/0226; H04L 27/2613; H04L 45/00; H04L 5/0023; H04L 5/0051; H04L 63/107
See application file for complete search history.

(56) References Cited

U.S. PATENT DOCUMENTS

| 3,648,177 A | 3/1972 | Himmel |
| 4,034,376 A | 7/1977 | Barton |
| 4,720,712 A | 1/1988 | Brookner et al. |

(Continued)

OTHER PUBLICATIONS

Extended Search Report for EP Patent Appln. No. 17306472.6 (dated Jun. 11, 2018).

(Continued)

*Primary Examiner* — Carl G Colin
*Assistant Examiner* — Andrew Suh

(57) ABSTRACT

A communication device includes a directional antenna, and a control circuit. The directional antenna has a directional radiation pattern for directing greater power of a transmitted signal in a specific direction. The control circuit is coupled to the directional antenna and determines an angle and a distance to another device. Based on the determined distance and angle to the another device, the control circuit selects a security level from a plurality of security levels for communication between the device and the another device. In another embodiment, a method for transmitting data between the first and second devices is provided.

15 Claims, 4 Drawing Sheets

(51) Int. Cl.
  *H04W 4/02* (2018.01)
  *H04W 12/63* (2021.01)

(56) References Cited

U.S. PATENT DOCUMENTS

| | | |
|---|---|---|
| 7,591,020 B2 | 9/2009 | Kammer et al. |
| 9,590,982 B2 | 3/2017 | Brewer et al. |
| 2006/0133338 A1 | 6/2006 | Reznik et al. |
| 2012/0242501 A1* | 9/2012 | Tran ................... A61B 5/7465 340/870.02 |
| 2013/0210345 A1 | 8/2013 | Ling et al. |
| 2017/0142589 A1 | 5/2017 | Park et al. |

OTHER PUBLICATIONS

Li, P., "UWB Tapered-Slot-Fed Antenna", IEEE 802.15, IEEE Conference on Ultra Wideband Systems, Technologies and Applications, May 2006.

Viot, M., "Automotive Security: Why UWB Measures Up", Embedded Systems Engineering, Sep./Oct. 2014.

Wikipedia, "IEEE 802.15", downloaded from the internet: https://en.wikipedia.org/wiki/IEEE_802.15#Task_Group_3:_High_Rate_WPAN, Downloaded Feb. 5, 2021.

* cited by examiner

SECURE ADAPTIVE WIRELESS COMMUNICATIONS

CROSS-REFERENCE TO RELATED APPLICATIONS

This application claims the priority under 35 U.S.C. § 119 of European patent application no. 17306472.6, filed on Oct. 26, 2017, the contents of which are incorporated by reference herein.

BACKGROUND

Field

This disclosure relates generally to communications, and more specifically to secure adaptive wireless communications.

Related Art

Various data communication technologies are available to allow wireless access to a large range of applications. Some of these wireless data communication technologies, for example, WiFi, Bluetooth, and near field communication (NFC), coexist in a communications device, such as a smart phone, tablet, or pad type computer, and often require dedicated components to implement each of the technologies. The communication technology used may be a trade-off between, for example, security, power consumption, network capability and data throughput. By way of example, WiFi may be preferred for high speed, long distance and large network access that requires only a low level of security for non-sensitive data. NFC may be preferred for high security application types involving very sensitive information such as payment. NFC is more secure than WiFi but has very short range and low data exchange rate. Integration of these different technologies together inside a communication device has a high cost due to the number of components necessary as well as the complexity of packing these components into a limited space.

Therefore, a need exists for a communications device using a single communication technology that combines higher security with longer range and higher data rates.

SUMMARY

In accordance with an aspect of the present disclosure, a communication device is provided, comprising: a directional antenna having a directional radiation pattern for directing greater power of a transmitted signal in a specific direction; and a control circuit coupled to the directional antenna, the control circuit determining an angle and a distance to another device, and based on the determined distance and angle to the another device, selecting a security level from a plurality of security levels for communication between the device and the another device.

In an embodiment, the directional antenna comprises an array of antenna elements for controlling a direction of the transmitted signal.

In an embodiment, the transmitted signal is characterized as being an ultrawide band signal.

In an embodiment, the directional antenna comprises an array of antenna elements for receiving a signal from another device, wherein the array of antenna elements is used to determine the angle to the another device.

In an embodiment, the another device is selected from among a plurality of devices and a remainder of the plurality of devices is unselected, and in response to the control signal selecting the security level, a direction of the directional antenna is set to avoid transmitting the transmitted signal to the unselected plurality of devices.

In an embodiment, the communication device further comprises an indicator for indicating the direction of transmitted signal from the directional antenna.

In an embodiment, the direction of the directional antenna is set at random and the direction is communicated to a user of the selected another device.

In an embodiment, a power level of the transmitted signal is adjusted based on the determined distance.

In an embodiment, the device has a fixed location and the another device is a mobile handheld device.

In accordance with another aspect of the present disclosure, a method for transmitting data between a first device and a second device is conceived, the method comprising: scanning for other devices using the first device; detecting a second device by the first device; determining that communication with the second device is authorized; determining a distance between the first device and the second device; selecting a security level of a plurality of security levels based on the determined distance between the first device and the second device; adjusting security parameters of the first device for the selected security level; and transmitting the data between the first and second devices.

In an embodiment, the first device is fixed at a single location, and the second device is a mobile handheld device.

In an embodiment, the method further comprises: directing an antenna of the first device away from other detected devices; adjusting a transmit power to the antenna to reduce the transmit range; and providing positioning information of a beam path from the antenna to a user of the second device.

In an embodiment, providing positioning information of a beam path from the antenna to a user of the second device further comprises providing an indication to a user of the second device where to position the second device for best reception of the transmitted data.

In an embodiment, the method further comprises adjusting a transmit power level of the first device based on the determined distance.

In an embodiment, selecting a security level of a plurality of security levels further comprises selecting the security level based on the determined distance and an angle from a projected centerline of the antenna direction.

In accordance with another aspect of the present disclosure, a method for transmitting data between a first device and a second device is conceived, the method comprising: scanning for other devices using a directional antenna of the first device to receive signals from the other devices; detecting a second device using the first device; determining that communication with the second device is authorized; determining a location of the second device relative to the first device; selecting a security level from a plurality of security levels based on the relative location of the second device; adjusting security parameters of the first device for the selected security level; and transmitting the data between the first and second devices.

In an embodiment, determining a relative location of the second device further comprises determining a distance and an angle to the second device based on a signal received from the second device.

In an embodiment, adjusting security parameters of the first device for the selected security level further comprising adjusting a transmit power based on the determined distance to the second device.

In an embodiment, the method further comprises setting a transmission direction of an antenna of the first device to avoid interception of the transmitted data by the other devices.

In an embodiment, the method further comprises providing information of the transmission direction of the first device by providing an indication to a user of the second device where to position the second device for best reception of the transmitted data.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
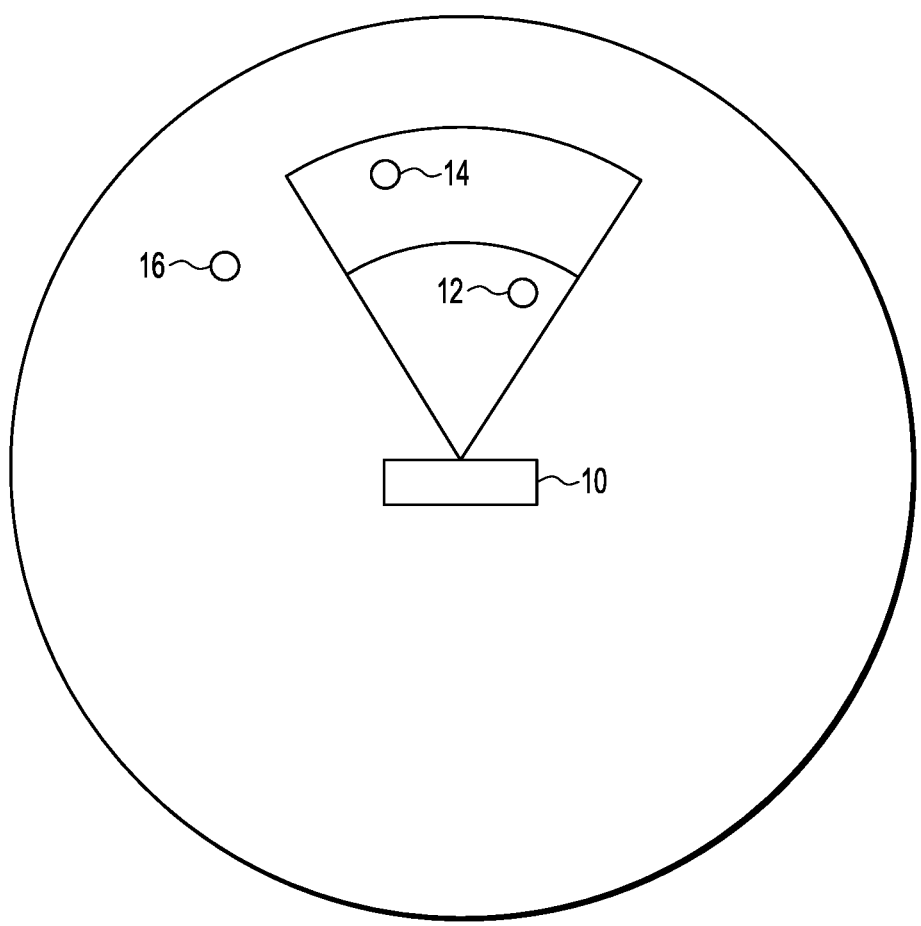
FIG. 1 illustrates in a top-down view a device and associated communication area having security zones of different security levels in accordance with an embodiment.

Generally, there is provided, in one embodiment, a device having the ability to communicate data at multiple security levels with one communication technology. In the device, a security level is chosen from a plurality of security levels based at least in part on a detected distance between the device and another device. The device includes a directional antenna array having a plurality of antenna elements, and the device may be fixed in one location. In one embodiment, if a detected distance between the devices is less than a first distance (e.g. 10 cm), then communication involving highly sensitive data such as payment or access is enabled. If the detected distance between devices is between the first distance and a second distance (e.g. 1 m to 5 m), then communication involving data having a medium sensitivity level, such as transport ticketing, video/image sharing is allowed. Beyond the second distance, only data having low sensitivity can be communicated, such as gaming, public information broadcasting, advertisement, etc. The antenna array allows beam forming to be used to provide a directable beam or to shape a transmission reception area. In another embodiment, a plurality of security zones may be organized as pie-shaped sectors that are bounded by distance from the fixed device and by a predetermined angle away from a centerline of the device's antenna array. Also, a transmitted signal may be focused and narrowed using beam forming and by adjusting the power of the transmitted signal. Beam forming can provide additional security by directing a transmitted signal in a path that avoids unintended recipients. Also, the security zones around an antenna can be moved, and rearranged, using beam forming. The fixed device may include an indicator, such as a graphical display, to allow an intended recipient of a transmission to properly position a mobile device in the beam for secure communication.

Providing secure communication in this manner allows the use of a single longer range communication technology such as UWB to provide higher data rates than is attainable using e.g., NFC.

In accordance with an embodiment, there is provided, a communication device including: a directional antenna having a directional radiation pattern for directing greater power of a transmitted signal in a specific direction; and a control circuit coupled to the directional antenna, the control circuit determining an angle and a distance to another device, and based on the determined distance and angle to the another device, selecting a security level from a plurality of security levels for communication between the device and the another device. The directional antenna may include an array of antenna elements for controlling a direction of the transmitted signal. The transmitted signal may be characterized as being an ultrawide band signal. The directional antenna may comprise an array of antenna elements for receiving a signal from the another device, wherein the array of antenna elements is used to determine the angle to the another device. The another device may be selected from among a plurality of devices and a remainder of the plurality of devices is unselected, wherein in response to the control signal selecting the security level, a direction of the directional antenna may be set to avoid transmitting the transmitted signal to the unselected plurality of devices. The device may further include an indicator for indicating the direction of transmitted signal from the directional antenna. The direction of the directional antenna may be set at random and wherein the direction is communicated to a user of the selected another device. A power level of the transmitted signal may be adjusted based on the determined distance. The device may have a fixed location and the another device is a mobile handheld device.

In another embodiment, there is provided, a method for transmitting data between a first device and a second device, the method including: scanning for other devices using a first device; detecting a second device by the first device; determining that communication with the second device is authorized; determining a distance between the first device and the second device; selecting a security level of a plurality of security levels based on the determined distance between the first device and the second device; adjusting security parameters of the first device for the selected security level; and transmitting the data between the first and second devices. The first device may be fixed at a single location, and the second device is a mobile handheld device. The method may further include: directing an antenna of the first device away from other detected devices; adjusting a transmit power to the antenna to reduce the transmit range; and providing positioning information of a beam path from the antenna to a user of the second device. Providing positioning information of a beam path from the antenna to the second device may further include providing an indication to a user of the second device where to position the second device for best reception of the transmitted data. The method may further include adjusting a transmit power level of the first device based on the determined distance. Selecting a security level of a plurality of security levels may further include selecting the security level based on the determined distance and an angle from a projected centerline of the antenna direction.

In yet another embodiment, there is provided, a method for transmitting data between a first device and a second device, the method including: scanning for other devices using a directional antenna of the first device to receive signals from the other devices; detecting a second device using the first device; determining that communication with the second device is authorized; determining a location of the second device relative to the first device; selecting a security level from a plurality of security levels based on the relative location of the second device; adjusting security parameters of the first device for the selected security level; and transmitting the data between the first and second devices. Determining a relative location of the second device may further include determining a distance and an angle to the second device based on a signal received from the second device. Adjusting security parameters of the first device for the selected security level may further include adjusting a transmit power based on the determined distance to the second device. The method may further include setting a transmission direction of an antenna of the first device to avoid interception of the transmitted data by the other devices. The method may further include providing information of the transmission direction of the first device by providing an indication to a user of the second device where to position the second device for best reception of the transmitted data.

FIG. 1 illustrates in a top-down view a communication area having security zones of different security levels associated with a device 10 in accordance with an embodiment. Device 10 may be a device for communicating wirelessly with other devices, such as devices 12, 14, and 16, that are within communication range of device 10. In one embodiment, device 10 is a device fixed in one location for providing various services requiring different levels of security such as banking, payment, access, transportation, or the like. The other devices 12, 14, and 16 may be mobile devices such as smart phones and other wireless handheld communication devices.

Device 10 and the other devices may use a relatively long range (e.g., 10 meter) and high speed communication technology such as WiFi or ultra-wide band (UWB) for the communication. Detected device location is used to control the exchange of data between device 10 and another device at one of a plurality of different security levels based on the device location relative to device 10. By comparison, typically, highly secure communication, e.g., contactless payment, relies on very short range communication that can be provided using near field communication (NFC), where the communication distance is in average only a few centimeters (cm).

The communication areas of FIG. 1 are organized as three areas, where the illustrated pie-shaped area is arranged as a security area Z1, a security area Z2, and a security area. Z3. In other embodiments, the number of security zones may be different. Security area Z1 has the highest security level of the three security zones. Security area Z2 has a medium security level, and security zone Z3 has the lowest security level. Devices located in the security zone Z1, such as device 12, can perform communication of any type of security level (high, medium and low security level). Only mid and low security level communications are allowed for device 14 in the medium security zone Z2. Devices in security zone Z3, such as device 16, are entitled to low security communication only. Generally, in accordance with a preferred embodiment, device 10 will perform a discovery phase to determine the location of available other devices 12, 14, and 16. There are various ways for device 10 to determine the locations. After, determining the locations, device 10 will apply the security level restrictions based on the determined locations as illustrated in FIG. 1. One of the devices 12, 14, and 16 can then be selected for communication using the appropriate security level.

Applying security levels to devices based on relative location allows high communication speed without compromising security. This also provides flexibility in using the same communication technology for various communication types instead of employing a different communication technology for each communication type.

Figure 2:
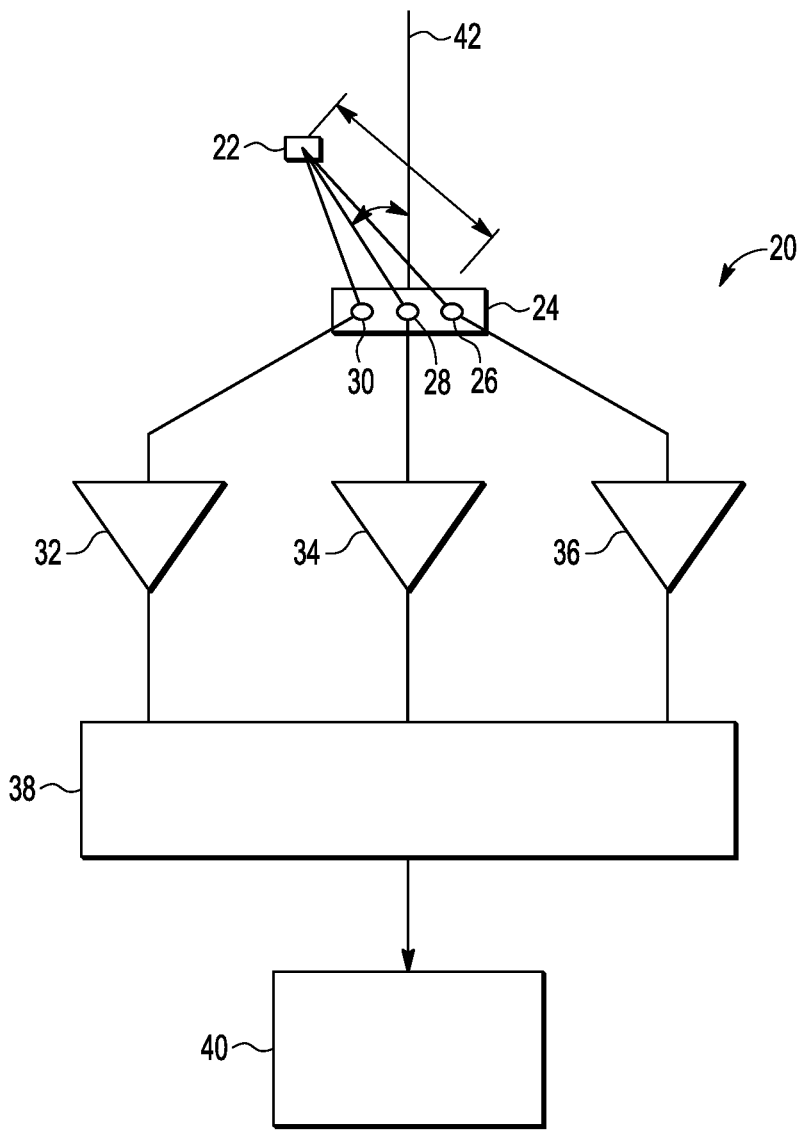
FIG. 2 illustrates a signal reception path for the device of FIG. 1. in accordance with an embodiment.

FIG. 2 illustrates a signal reception path 20 for a device such as device 10 in accordance with an embodiment. As discussed above, device 10 may be at a fixed location, or at a location that changes infrequently. Signal reception path 20 includes antenna 24, amplifiers 32, 34, and 36, phase difference detector 38, and processor 40. Antenna 24 is an antenna array including a plurality of antenna elements represented by antenna elements 26, 28, and 30. The optimum physical distance between individual antenna elements of the antenna array for beam forming and spatial angle detection is related to the frequency/wavelength of the employed signal. The higher the frequency, the shorter the optimum distance between the individual antenna elements of the antenna array. Therefore, a gigahertz (GHz) range signal is suitable for a more compact antenna array. UWB technology is also adapted for both short pulse carrier and free direct sequence communication mode (IR-UWB), ideal for device location, and multiband OFDM (MBOFDM) communication mode which is robust to interference and provides multi-path high speed data communication. Amplifiers 32, 34, and 36 are connected to a corresponding one of antenna elements 26, 28, and 30. For example, amplifier 32 has an input connected to antenna element 30. Phase difference detector 38 has an input connected to an output of each of amplifiers 32, 34, and 36. An output of phase difference detector 38 is connected to processor 40. FIG. 2 illustrates just one example of signal reception path circuitry. Different signal reception paths can be implemented in other embodiments using different components. Note that processor 40, and phase difference detector 38 may be implemented together on a single integrated circuit or separately on multiple integrated circuits.

When a device authorized and equipped to communicate with device 10, such as device 22, is detected within range of device 10 (FIG. 1), device 10 attempts to determine the relative location of device 22. Device 10 first broadcasts an interrogation signal in all directions and device 22 responds with an answer signal. A distance $d_1$ is determined by calculating a time difference $T_{DIFF}$ between the moment when the interrogating device sends out the interrogation signal consisting of high frequency radio frequency (RF) pulses and the moment where device 10 receives the answer from the interrogated device 22 also in the form of high frequency RF pulses. Time measurement can be done by means of a timer in, for example, processor 40. The timer is started when the interrogation signal is transmitted, and stopped when the answer is received from the interrogated device. The distance $d_1$ between the devices is then $d_1 = (T_{DIFF} - T_{OP})/c$, with $T_{OP}$ being the time duration necessary for the interrogated device to process and send back the answer and c being the propagation speed of electromagnetic waves ($3 \times 10^8$ m/s).

A spatial angle $\alpha_1$ is defined by measuring a signal phase difference of the RF pulses received at a given time by individual antenna elements 26, 28, and 30. Antenna elements 26, 28, and 30 are formed into an equally spaced antenna array. A left path is shown from antenna element 30 to device 22, a center path is shown from antenna element 28, and a right path is shown from antenna element 26. Phase difference detector 38 determines a phase difference of the right and left paths as compared to the middle path. The middle path functions as a reference path. In a first configuration, the interrogated device 22 is located at an angle $\alpha_1$ relative to a center line 42 of antenna array 24. The received signal travel path of the left path is shorter than the received signal path of the middle path, and the received signal travel path of the right path is longer than the middle path. This leads to a negative phase difference ($\psi_{LEFT}-\psi_{REF}$) for the left path and a positive phase difference ($\psi_{RIGHT}-\psi_{REF}$) for the right path, where $\psi$ represents phase. Besides the sign, the higher the difference in signal path, the larger the value of the phase difference. Note that if device 22 was located on the other side of centerline 42, the right path would have a negative phase difference and the left path would have a positive phase difference.

The detected distance $d_1$ and spatial angle $\alpha_1$ in the above equations are processed by processor 40. Using the detected distance $d_1$ and spatial angle $\alpha_1$, processor 40 can determine a relatively precise spatial position of the interrogated device relative to device 10. As part of the response, interrogated device 22 may also provide other information such as the supported type of communication, the level of security required, and/or sensitivity of the data to be communicated.

Figure 3:
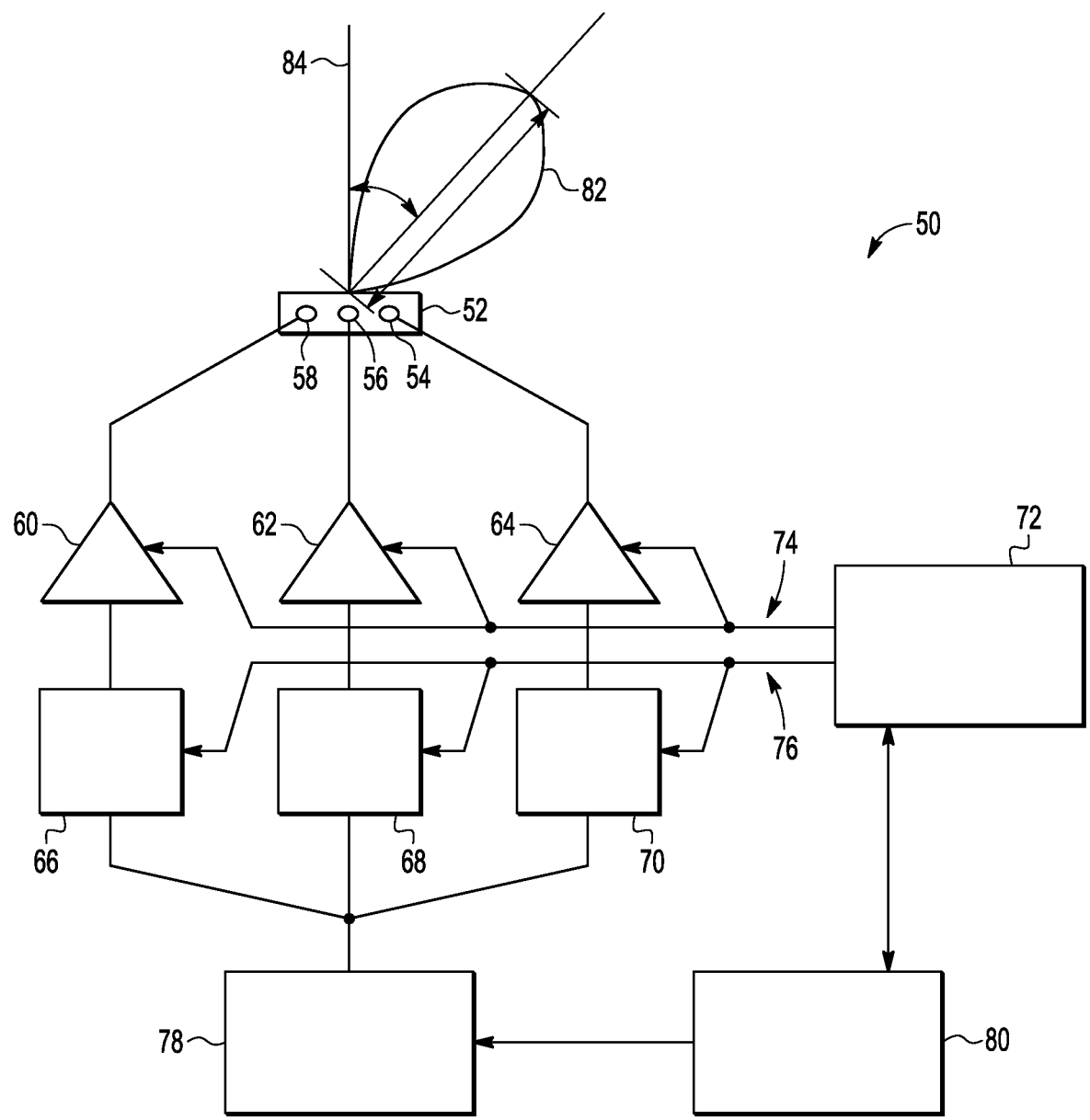
FIG. 3 illustrates a signal transmission path for the device of FIG. 1. in accordance with an embodiment.

FIG. 3 illustrates a signal transmission path 50 for device 10 of FIG. 1 in accordance with an embodiment. Signal transmission path 50 includes a plurality of transmit paths (three representative paths in FIG. 3). Each path is coupled to an antenna element of antenna array 52. Antenna arrays 52 and 24 (FIG. 2) can be the same antenna array. Antenna array 52 provides a directional antenna having a controllable radiation pattern so that a transmitted signal has greater power in a specific direction. Each transmit path consists of a controllable phase shifter and a controllable amplifier. Specifically, signal transmission path 50 includes antenna 52, amplifiers 60, 62, and 64, controllable phase shifter circuits 66, 68, and 70, controller 72, signal generator 78, and processor 80. Signal generator 78 has an output connected to inputs of controllable phase shifter circuits 66, 68, and 70. Controllable phase shifter circuits 66, 68, and 70 have outputs connected to inputs of amplifiers 60, 62, and 64. Antenna 52 includes an array of antenna elements 54, 56, and 58. Amplifiers 60, 62, and 64 are connected to provide an amplified signal to a corresponding one of antenna elements 58, 56, and 54. Controller 72 adjusts separately the phase shift and gain of each transmit path to achieve the desired transmission beam characteristics (i.e., beam width, angle, and communication distance). As illustrated, the output of each amplifier has an amplitude A and a phase iv. For example, amplifier 60 provides an output having amplitude $A_1$ and phase $\psi_1$, amplifier 62 provides an output having amplitude $A_2$ and phase $\psi_2$, and amplifier 64 provides output having amplitude $A_3$ and phase $\psi_3$. Processor 80 oversees the operation of controller 72 and signal generator 78. Note that processor 80, controller 72, and signal generator 78 may be implemented as a single integrated circuit or by using multiple integrated circuits.

In one embodiment, as described above, to avoid exposure to potential hacking devices, communication of data with a given sensitivity level is enabled only if the device to be communicated with is located within a given distance from device 10 as illustrated in FIG. 1. For example, communication involving highly sensitive personal data such as payment and access control may be enabled only if the detected distance between the devices is below a first level (10 cm for instance). Exchange of data with a medium sensitivity level such as transport ticketing, video/image sharing may be allowed for distance up to a second level (1 m-5 m). Beyond the second security level, only the communication of data with a low sensitivity level may be allowed (gaming, public information broadcasting, advertisement etc.). A table, stored in device 10, may provide the correspondence between device distance and data sensitivity level authorized for exchange. Although three data sensitivity levels seem to be an optimum, any number of levels can be considered depending on the need.

For a relatively long range communication technology such as UWB, further steps may be performed to further protect the exchanged sensitive data. For example, a transmit power provided to transmit the signal may be adjusted to a level that is only sufficient for communicating over the detected distance. Also, beam forming of beam 82 radiated from antenna 52 may be performed to reduce the space coverage to the limited area around the detected location of the other devices and to change the direction of the transmitted signal. The use of beam forming ensures higher security communication while making use of a longer range and higher speed technology than e.g., NFC. Like the detection of the spatial angle of a target device, beam forming is achieved using antenna array 52 having a plurality of antenna elements as illustrated in FIG. 3. Each individual antenna element is fed with radio frequency (RF) pulses having a different amplitude and phase. Varying the amplitude A and phase $\psi$ of the transmitted signal provides steering of the transmitted signal towards a given direction, that is, as determined by an angle $\alpha_2$ relative to antenna centerline 84. The range of beam 82 is thus limited to a given distance $d_2$ and with a given spatial coverage by narrowing or widening the beam 82.

A possible scenario is in a shop with a wireless device at a fixed position. The device may provide several services such as payment of purchases (highly sensitive data exchange) as well as broadcasting advertisement to customers' smartphones located nearby (low sensitivity data exchange). A customer with a smartphone approaches device 10 to initiate a contactless payment transaction. Device 10 detects the smartphone as being within the secured distance and accepts the request for a contactless payment. Then, the fixed device 10 randomly selects the signal beam direction and provides the indication of such direction on an interface. The interface is only visible to the customer in front of device 10. The selected direction is preferably not in the straight line between device 10 and one or more queued customers. Next, the customer places his smartphone in the area indicated by the interface to complete the secure transaction.

Figure 4:
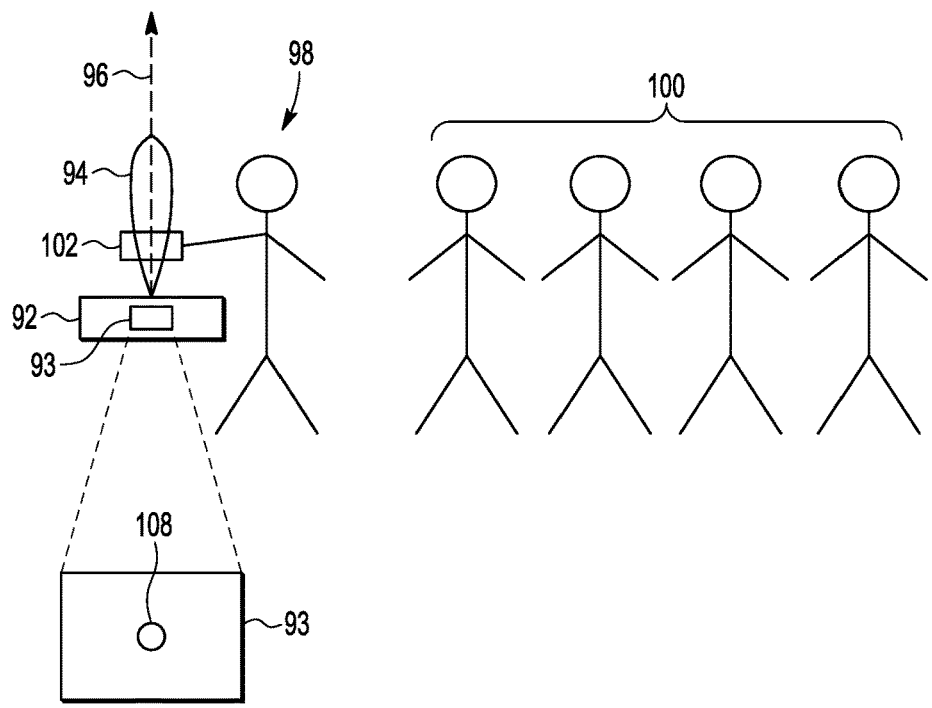
FIG. 4 illustrates a secure transaction in accordance with an embodiment.

FIG. 4 illustrates a secure transaction in accordance with another embodiment. As illustrated, a signal transmission direction may be changed by steering the transmitted signal in a direction that would make it less likely for the signal to be intercepted by an attacker. In one embodiment, the signal can be directed in any direction. A fixed device 92 scans for other devices. Fixed device 92 determines a location for each of the devices detected within range. A mobile device 102 in the possession of customer 98 is selected for a requested transaction. Based on the type of communication desired, it is determined if the location of mobile device 102 is within the zone having the appropriate security level. Device 102 then selects the necessary security level and adjusts security parameters for communication under the selected security level. Only one device is selected for communication at a time. When beam 94 is transmitted, fixed device 92 determines a safe direction so that the other detected but unselected devices are not in beam path 96. As directed by interface 93, customer 98 holds mobile device 102 in the beam path 96 of beam 94 to intercept the beam for best reception of the transmitted data and communicates with device 92. This embodiment may be desirable in an environment that is well known, for example, a payment area in a shop. More specifically, after the location of the device 102 and determination that a sensitive data exchange is requested and approved, the beam of the communication fixed device 92 may be steered in a fixed direction but significantly deviating from the customer's queue line (toward the ceiling for instance) to avoid communication interception by the mobile devices of other customers 100. The location of the beam direction 96 may be indicated on interface 93 to customer 98 so that customer 98 knows where to hold the device. Interface 93 may be a graphical interface having a display protected from view by other customers 100. In one embodiment, the position of a circle 108 on a screen of interface 93 indicates a location of the beam (see inset of a magnified view of interface 93 in FIG. 4).

Figure 5:
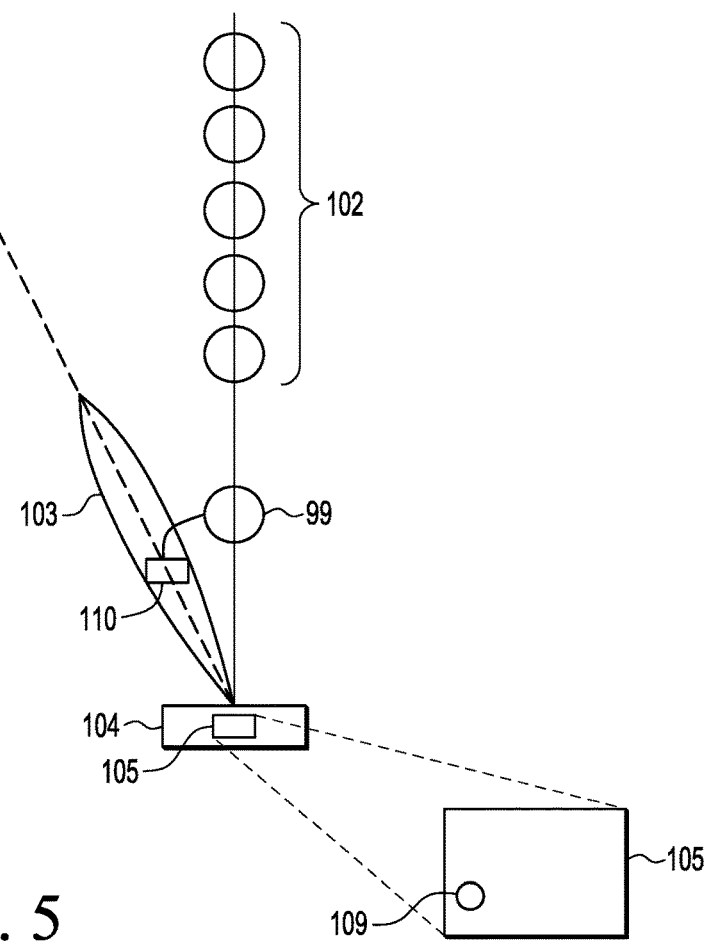
FIG. 5 illustrates another secure transaction, in a top-down view, in accordance with another embodiment.

FIG. 5 illustrates another secure transaction, in a top-down view, in accordance with another embodiment. In FIG. 5, a customer 99 with smart phone 110 is in a transaction with fixed device 104. Other customers 102 are queued nearby. If modulating the transmission power and beam forming fails to adequately protect the signal from a persistent attacker, a randomly changed beam direction may further reduce the interception risk. The beam may be randomly directed in different directions so that the beam is not always pointing in the same direction and not in a direction toward other customers 102. In FIG. 5, fixed device 104 may choose the beam direction randomly and display the location of beam 103 on interface 105 as a location 109 for customer 99 (see magnified view of interface 105). Customer 99 holds a mobile device 110 in the beam for data transfer. A direction of beam 103 can be changed to another direction randomly and the location 109 on interface 105 will be updated accordingly so that customer 99 is able to reposition device 110.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A device comprising:
a directional antenna having a directional radiation pattern for directing greater power of a transmitted signal in a specific direction along an antenna centerline of the directional antenna; and
a control circuit coupled to the directional antenna, the control circuit determining an angle and a distance to another device, and based on the determined distance and angle to the another device, selecting a security level from a plurality of security levels for communication between the device and the another device,
wherein said security levels belong to different security zones organized as pie-shaped sectors that are bounded by distance and by a predetermined angle away from the antenna centerline, and
wherein selecting the security level comprises determining a location of the another device based on the determined distance and angle to the another device, selecting one of said security zones based on said location, and selecting the security level which belongs to the selected security zone.

2. The device of claim 1, wherein the directional antenna comprises an array of antenna elements for controlling a direction of the transmitted signal.

3. The device of claim 1, wherein the transmitted signal is characterized as being an ultrawide band signal.

4. The device of claim 1, wherein the directional antenna comprises an array of antenna elements for receiving a signal from the another device, wherein the array of antenna elements is used to determine the angle to the another device.

5. The device of claim 1, wherein the another device is selected from among a plurality of devices and a remainder of the plurality of devices is unselected, wherein in response to a control signal selecting the security level, a direction of the directional antenna is set to avoid transmitting the transmitted signal to the unselected remainder of the plurality of devices.

6. The device of claim 5, further comprising an indicator for indicating the direction of transmitted signal from the directional antenna.

7. The device of claim 5, wherein the direction of the directional antenna is set at random and wherein the direction is communicated to a user of the selected another device.

8. The device of claim 1, wherein a power level of the transmitted signal is adjusted based on the determined distance.

9. The device of claim 1, wherein the device has a fixed location and the another device is a mobile handheld device.

10. A method for transmitting data between a first device and a second device, the method comprising:
scanning for other devices using the first device;

detecting a second device by the first device;
determining that communication with the second device is authorized;
determining a location of the second device by using an antenna at the first device to determine a distance and an angle to the second device, where the antenna has a directional radiation pattern for directing greater power of a transmitted signal along an antenna centerline;
selecting a security level of a plurality of security levels based on the location of the second device;
adjusting security parameters of the first device for the selected security level; and
transmitting data between the first and second devices,
wherein the plurality of security levels belong to different security zones organized as pie-shaped sectors that are bounded by distance and by a predetermined angle away from the antenna centerline, and
wherein selecting the security level comprises selecting one of said security zones based on the location of the second device and selecting the security level which belongs to the selected security zone.

11. The method of claim 10, wherein the first device is fixed at a single location, and the second device is a mobile handheld device.

12. The method of claim 10, further comprising:
directing the antenna of the first device away from other detected devices;
adjusting a transmit power to the antenna to reduce a transmit range of the first device; and
providing positioning information of a beam path from the antenna to a user of the second device.

13. The method of claim 12, wherein providing positioning information of a beam path from the antenna to a user of the second device further comprises providing an indication to a user of the second device where to position the second device for best reception of the transmitted data.

14. The method of claim 10, further comprising adjusting a transmit power level of the first device based on the determined distance.

15. The method of claim 10, wherein selecting a security level of a plurality of security levels further comprises selecting the security level based on the determined distance and angle from a projected centerline of the antenna direction.

* * * * *